(12) United States Patent
Osnato (10) Patent No.: US 12,005,370 B2
(45) Date of Patent: Jun. 11, 2024

(54) TOY SYSTEM WITH NESTING REPLICAS

(71) Applicant: WeCool Toys Inc., Point Pleasant, NJ (US)

(72) Inventor: Jeffrey Osnato, Medford, NJ (US)

(73) Assignee: WeCool Toys Inc., Point Pleasant, NJ (US)

( * ) Notice: Subject to any disclaimer, the term of this patent is extended or adjusted under 35 U.S.C. 154(b) by 210 days.

(21) Appl. No.: 17/453,301

(22) Filed: Nov. 2, 2021

(65) Prior Publication Data

US 2022/0126212 A1   Apr. 28, 2022

Related U.S. Application Data

(63) Continuation of application No. PCT/US2020/031275, filed on May 4, 2020.

(60) Provisional application No. 62/842,275, filed on May 2, 2019.

(51) Int. Cl.
*A63H 33/00* (2006.01)
*A44C 27/00* (2006.01)
*A63H 3/00* (2006.01)

(52) U.S. Cl.
CPC ............. *A63H 3/005* (2013.01); *A44C 27/00* (2013.01); *A63H 33/00* (2013.01)

(58) Field of Classification Search
CPC ...... A63H 3/005; A63H 33/00; A63H 33/001; A63H 33/30; A63H 33/32; A63H 3/16; A44C 27/00
USPC .................. 446/69, 73, 74, 75, 76; 206/457
See application file for complete search history.

(56) References Cited

U.S. PATENT DOCUMENTS

| | | | | |
|---|---|---|---|---|
| 255,534 A | * | 3/1882 | Reeve | A63H 3/005 446/74 |
| 3,047,979 A | * | 8/1962 | Hrucz | A63H 33/00 446/144 |
| 3,434,232 A | * | 3/1969 | Tarrson | A63H 33/32 446/70 |
| 3,447,256 A | * | 8/1969 | Compton | A63H 33/001 434/84 |
| 3,459,294 A | * | 8/1969 | Crosman | B65D 11/00 D9/418 |
| 3,707,289 A | * | 12/1972 | Wicks | A63B 69/12 273/440 |
| 3,960,377 A | * | 6/1976 | Doyle | A63F 9/00 273/459 |

(Continued)

*Primary Examiner* — Alexander R Niconovich
(74) *Attorney, Agent, or Firm* — McKee, Voorhees & Sease, PLC (57) ABSTRACT

A children's play toy includes an openable replica, a play compound within the replica, and one or more additional replicas nested within the openable replica. The additional replicas partially adhere to at least a portion of the play compound. For example, an oyster replica includes a play compound forming the mantle of the oyster and a second oyster which must be dug out of the mantle with a shovel or sword replica. The second oyster can have collectable pearl(s) contained therein. The pearls can then be assembled onto a customizable necklace and/or bracelet. The play compound which makes up the mantle can be independently played with. Children can use the toy to play with other children and to engage social media. The toy can be heat sealed to prevent the play compound from substantially moving or deteriorating before use.

11 Claims, 6 Drawing Sheets

(56) References Cited

U.S. PATENT DOCUMENTS

| | | | | |
|---|---|---|---|---|
| 4,050,697 A * | 9/1977 | Purviance | A63F 7/3603 | 209/479 |
| 4,964,831 A * | 10/1990 | Wolff | A63H 3/50 | 446/268 |
| 5,064,398 A * | 11/1991 | Richardson | A63H 33/00 | 446/73 |
| 5,429,541 A * | 7/1995 | Landon | A63H 33/32 | 383/4 |
| 5,480,341 A * | 1/1996 | Plakos | A63H 3/16 | D21/615 |
| 5,692,943 A * | 12/1997 | Copp | A63H 33/30 | 273/DIG. 25 |
| 5,730,293 A * | 3/1998 | Kelly | A63H 33/32 | 434/84 |
| 5,758,777 A * | 6/1998 | Dods | A47F 7/142 | 446/73 |
| 5,810,364 A * | 9/1998 | Canion | A63B 67/007 | 273/447 |
| 5,924,695 A * | 7/1999 | Heykoop | A63F 9/00 | 273/459 |
| 5,941,712 A * | 8/1999 | Smith | G09B 23/36 | 273/157 R |
| 6,152,298 A * | 11/2000 | Dods | B65D 77/24 | 206/335 |
| 6,719,606 B1 * | 4/2004 | Mukensturm | A63H 3/005 | 446/72 |
| 6,752,679 B1 * | 6/2004 | Lui | A63H 3/16 | 446/69 |
| 7,168,565 B2 * | 1/2007 | Scott | B65D 75/56 | 206/459.5 |
| 7,182,601 B2 * | 2/2007 | Donnan | A63H 3/005 | 434/238 |
| 7,186,161 B2 * | 3/2007 | Salas Peralta | G09B 25/04 | 446/108 |
| 7,477,386 B2 * | 1/2009 | Saha | G01N 21/21 | 446/491 |
| 7,614,498 B2 * | 11/2009 | O'Keefe | B65D 75/366 | 206/459.5 |
| 8,459,647 B2 * | 6/2013 | Ferron | A63H 13/10 | 273/262 |
| 8,657,117 B2 * | 2/2014 | Musico | A63H 33/00 | 446/75 |
| 10,220,324 B1 * | 3/2019 | Shoaff | A63H 3/005 | |
| 2002/0005365 A1 * | 1/2002 | Gordon | B65D 25/08 | 446/73 |
| 2004/0142628 A1 * | 7/2004 | Pino | A63H 3/16 | 446/69 |
| 2005/0106988 A1 * | 5/2005 | Feld | A63H 3/16 | 446/73 |
| 2005/0142980 A1 * | 6/2005 | Rivero | B65D 81/365 | 446/75 |
| 2006/0128269 A1 * | 6/2006 | Choi | G09B 25/04 | 446/476 |
| 2007/0155280 A1 * | 7/2007 | Patean | A63H 3/44 | 446/385 |
| 2009/0073673 A1 * | 3/2009 | Young | G09F 13/04 | 362/362 |
| 2010/0068967 A1 * | 3/2010 | Hume | A63F 9/0873 | 446/236 |
| 2011/0177479 A1 * | 7/2011 | King | A63F 3/00145 | 446/268 |
| 2015/0173471 A1 * | 6/2015 | Weems | A44C 25/004 | 63/19 |
| 2018/0161685 A1 * | 6/2018 | Garren | G09B 19/00 | |
| 2018/0325227 A1 * | 11/2018 | McCafferty | A63H 33/00 | |

* cited by examiner

TOY SYSTEM WITH NESTING REPLICAS

CROSS REFERENCE TO RELATED APPLICATIONS

This application is a by-pass continuation of PCT/US20/31275 filed May 4, 2020, which claims priority to U.S. provisional patent application Ser. No. 62/842,275, filed May 2, 2019. The applications are herein incorporated by reference in their entirety, including without limitation, the specification, claims, and abstract, as well as any figures, tables, appendices, or drawings thereof.

FIELD OF THE INVENTION

The present invention relates generally to openable toy(s) or a toy kit for children to play with. More particularly, but not exclusively, the present invention relates to an oyster shaped toy having imagination inspiring, miniature, and aquatic themed replicas placed within or adhering to a play compound, the aquatic themed replicas further capable of containing collectable treasures.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Children love toys. For children, toys are more than just fun and games. Most toys provide at least some opportunity for children to learn. The best toys engage the senses, spark imaginations and encourage children to interact with others.

From a very early age, children are eager to learn more about the world around them. Every new shape, color, texture, taste, and sound presents an opportunity to learn more. Parents quickly identify giving their children toys that are safe and stimulating will help their children discover their senses. Rattles and toys that make music are favorites of infants. Toys with contrasting colors are fascinating to babies and stimulate their developing vision. As they grow, infants can use toys to explore object permanence and cause and effect relationships. They also need objects such as blocks to help them build motor skills and hand-eye coordination.

Toddlers can play with a wider variety of toys than infants. Toddlers may still enjoy some of the toys they played with as babies, however they also need that are designed with their increased capability to learn in mind. Even the same blocks they played with previously can provide them with new and different educational opportunities as their knowledge expands. Shape sorters are great for toddlers. They teach them how to match similar items and provide parents the opportunity to teach them the names of the shapes. Lego® blocks, for example, provide an opportunity to learn more about colors and symmetry developing a child's motor skills.

When children reach schooling age, parents and teachers shift their focus from helping children discover their senses to developing a child's aptitude for lingual (e.g., written and spoken), numeric, memorial, and social skills. There are a lot of toys that encourage this type of learning, from simple alphabet puzzles to high-tech electronic gadgets. These toys help give children a head start by introducing them to the things they will be learning in school. Kids who are in school can supplement their learning with recreational and educational toys. Giving children the opportunity to have fun while practicing the things they are learning in school will increase their retention of those things.

The act of collecting toys offers an opportunity for a child to make an emotional connection with their toys. Not surprisingly, the value a child assigns to any given collection is not monetary but sentimental. The collections allow children to relive previous experiences and connect themselves to a period or to a time they feel strongly about. This in effect helps ease insecurity and anxiety and allows the past to continue to exist in the present. Some children collect for the thrill of the hunt. For these children, collecting is a quest, and may develop into a lifelong pursuit which can never be completed. When children collect, they experiment with arranging, organizing, and presenting a part of the world which may serve to provide a safety zone, a place of refuge where fears are calmed and insecurity is managed. Motives are not mutually exclusive, rather, different motives combine for each collector for a multitude of reasons.

It is often a challenge for toy developers to design a collection which can be easily transported from place to place while the child is not playing with the toy collection, stimulate the child's senses while the child is playing with the toy collection, and still challenge the child's aptitude for continued learning. Designing toys of the collection such that they can opened, closed, and nested within one another, e.g., matryoshka dolls, can provide easy transportation of the collection from place to place. However, these toy collections are often limited in their ability to stimulate a child's senses while the child is playing with the toy collection and to challenge the child's aptitude for continued learning.

Thus, there exists a need in the art for toy(s) which address these issues and do not rely on the use of expensive, high-tech electronic gadgets.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

It is a further object, feature, and/or advantage of the present invention to allow for children to collect and/or salvage toys, arts, and/or crafts. Yet another object, feature, and/or advantage of the present invention to facilitate play with the same. For example, a means for engaging social media may be provided with the toy and/or crafts such that the children may compare collections with other children.

It is still yet a further object, feature, or advantage of the present invention to package the toy in a way which reduces waste. For example, the toy can be packaged in a carrying case which can then be used to transport components of the toy system or toy collection. The toy could be packaged separately in packaging which includes instructions for how to use the toy and a means for storing the toy on store shelves, such as a hang tab, while the toy is marketed to children.

It is still yet a further object, feature, or advantage of the present invention to provide a toy that may be used in a wide variety of applications. For example, children can salvage components of the toy to build a collection, play with individual components of the toy, or form new toys such as jewelry from previously salvaged components of the toy.

It is still yet a further object, feature, or advantage of the present invention to provide a toy which allows a child to customize his or her playing experience to suit his or her interests.

It is preferred the apparatus be safe, cost effective, and durable. For example, provided play compounds are preferably non-toxic and do not pose a substantial risk of choking. The toys and/or crafts provided are preferably easily cleaned for repeat play.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the present invention.

Methods can be practiced which facilitate use, manufacture, assembly, maintenance, and repair of nesting replicas which accomplish some or all of the previously stated objectives.

The nesting replicas described herein can be incorporated into systems or kits which accomplish some or all of the previously stated objectives.

According to some aspects of the present disclosure, a toy system comprises a first, openable replica, a play compound positioned on a portion of an interior surface of the first replica, and a second replica nested within the first replica and positioned partially within the play compound. The first replica may include an upper shell and a lower shell and the play compound may completely cover an interior surface of the lower shell. The upper and lower shell be attached to one other through a hinged connection. The second replica may be a pearl replica, an openable mermaid tail, or an openable oyster having a first shell and a second shell. Other replica (s), such as additional pearl replica(s), may be nested within the second replica. A carrying case having a shape substantially identical to a shape of the first replica may be included. The play compound can be formed of two or more play compound components selected from the group consisting of a borate, guar gum, starch, a colorant, a phosphate, an ethanol, an acetate, a decorative additive, and a liquid, such as water. At least one of the play compound components is typically included to provide a visual or tactile effect. The play compound may be physically manipulated between a compact form and a stretch form. The first replica may comprise a thermoplastic, which may or may not include a heat seal to retain the first replica in a closed position. At least one of the replicas may include an exterior surface having at least one tactile element selected from the group consisting of indents, notches, bumps, tabs, and apertures. Alternatively, the group may consist of grooves, ridges, and scales. An opening tool may be mounted to the first replica for opening the first replica and/or the second replica.

According to some other aspects of the present disclosure, a toy kit comprises a first, openable replica, a play compound, and a second replica capable of nesting in the first replica. The toy kit may further comprise subsequent replica (s) configured to nest in the second replica. An opening tool for opening the first replica and/or the second replica may comprise a blade with an edge and a point, a hilt for gripping the opening tool, and a cross-guard or step for preventing injury to a user and/or damage to an object contained within the first replica and/or second replica. A carrying case for transporting at least the first replica may be included, the carrying case potentially having a handle and being substantially identically shaped to the first replica. The kit may be provided with packaging encompassing a portion of the first replica. The packaging may comprise a product identifier on the packaging, image(s) of at least one component of the toy kit on the packaging, a hang tab, and/or instructions for using toy(s) within the toy kit. The toy kit can further include a string and ornamentation for forming a bracelet and/or a necklace. The play compound is typically formed of two or more play compound components selected from the group consisting of a borate, guar gum, starch, a colorant, a phosphate, an ethanol, an acetate, a decorative additive, and a liquid, such as water. At least one of the play compound components is included to provide a visual or tactile effect. The play compound may be physically manipulatable between a compact form and a stretch form.

According to some other aspects of the present disclosure, a method of playing with a toy system comprises opening a first replica and digging a second replica out of a play compound located within the first replica. According to some additional aspects of the present disclosure, the method may further comprise opening the second replica, salvaging a third replica from within the second replica, broadcasting a person performing each step of the method, repeating each step of the method to collect ornamentation of varying rarity for a bracelet and/or a necklace, assembling a bracelet and/or a necklace with a string and the ornamentation for the bracelet and/or the necklace, adding a colorant and/or a decorative additive to alter the play compound, stretching and/or compacting the play compound, and/or storing components of the toy system in a carrying case. The opening step(s) may comprise gripping an opening tool with a user's hands, inserting the opening tool in a selected replica, and prying the selected replica open.

These and/or other objects, features, advantages, aspects, and/or embodiments will become apparent to those skilled in the art after reviewing the following brief and detailed descriptions of the drawings.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

An artisan of ordinary skill need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
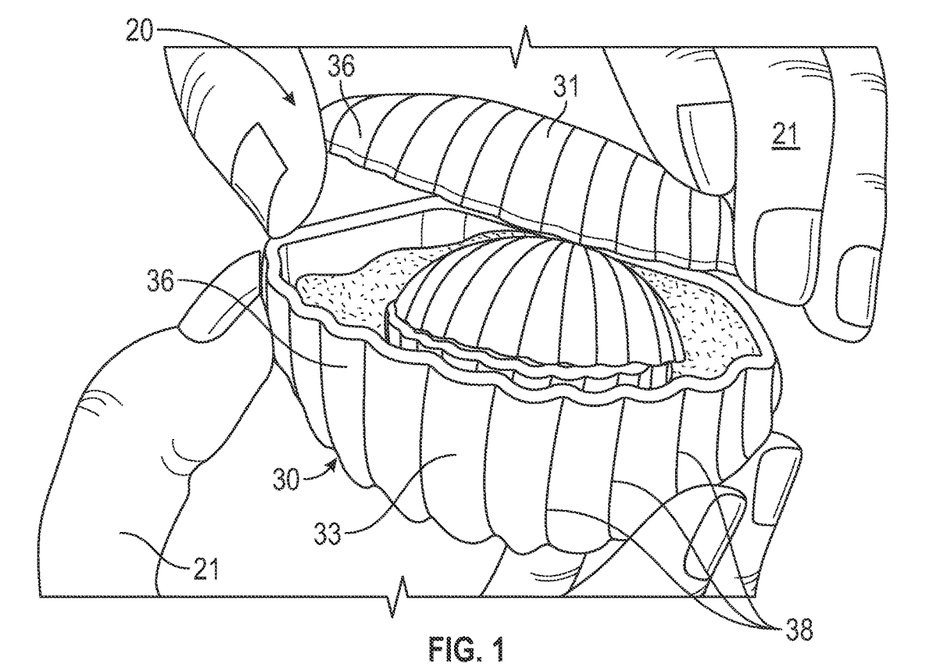
FIG. 1 shows a perspective view of an oyster-shaped toy system having a smaller openable oyster inside a larger openable oyster, the larger openable oyster in a partially closed position, according to some aspects of the present disclosure.
Figure 2:
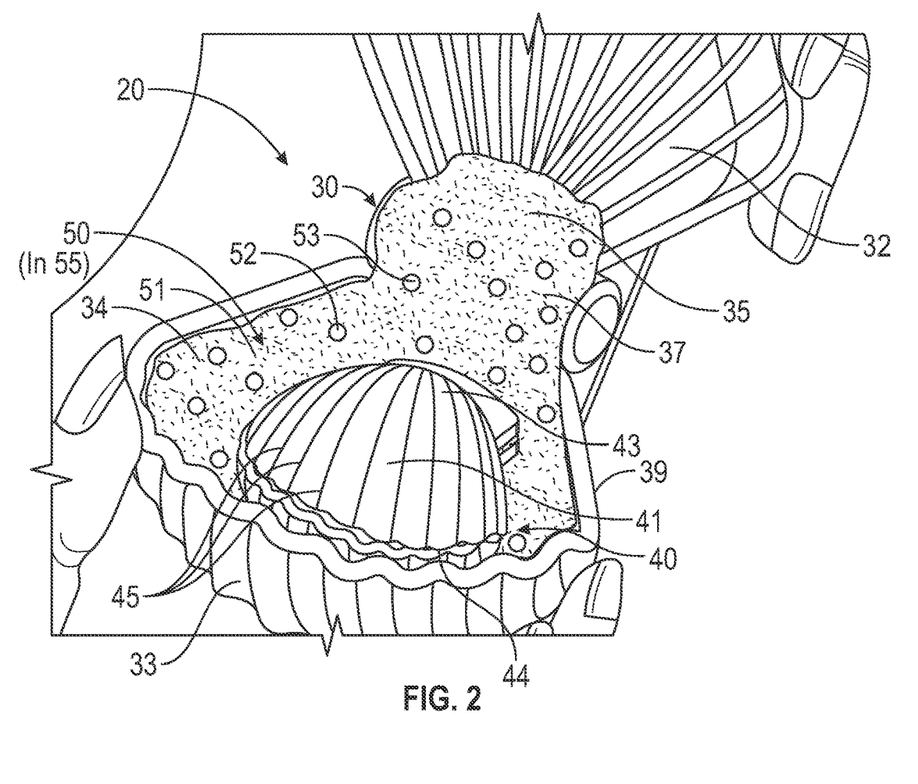
FIG. 2 shows a perspective view of an oyster-shaped toy system having a smaller openable oyster inside a larger openable oyster, the larger openable oyster in an open position, according to some aspects of the present disclosure.

Referring now to the figures, FIGS. 1-2 show a toy system or kit 20 being held in the hands 21 of a child. According to a non-limiting aspect of the present disclosure, the toy system or kit 20 includes a first, larger oyster replica 30 having an upper shell and a lower shell. The upper shell includes an upper shell exterior surface 31 and an upper shell interior surface 32. The lower shell includes a lower shell exterior surface 33 and a lower shell interior surface 34.

In a preferred embodiment, the upper shell and the lower shell are separate components hingeably connected towards a posterior portion 35 of the first oyster replica such that the upper shell and the lower shell can move away from or towards one another (i.e., open and close) at an anterior portion 36 of the upper shell. The upper shell can be fixed with respect to the lower shell, the lower shell can be fixed with respect to the upper shell, or both shells may be moveable with respect to one another. A lower edge of the upper shell is shaped to mate with an upper edge of the lower shell at the anterior portion 36 when the first oyster replica 30 is in the closed position. As the upper shell and lower shell are pulled away from one another (i.e. opened), the first oyster replica 30 transitions from the closed position to a partially closed position and later from the partially closed position to an open position. Biasing elements, such as springs, actuators, an element configured to utilize a gravitational force, or any other known means for facilitating bias may be included to retain and/or return the first oyster replica 30 is any one or several given position(s).

The hinged connection is typically established through a hinge 37 comprising a pin, a knuckle, and a leaf. The pin is typically a rod that holds the leaves together inside the knuckle. The knuckle is typically a hollow and circular portion which creates a joint of the hinge through which the pin is set. The knuckles of either leaf typically alternate and interlock with the pin passing through all of them (i.e., a loop, joint, node, or curl). The leaf is the portion (there are typically two) that extends laterally from the knuckle and revolves around the pin.

The hinge 37 can be characterized by its end play, gauge, hinge width, hinge length, knuckle length, leaf width, pitch, and slop. End play refers to the axial movement between the leaves along the axis of the pin. This motion allows the leaves to rotate without binding and is determined by the typical distance between knuckles (knuckle gap) when both edges of the leaves are aligned. Gauge refers to the thickness of the leaves. Hinge width refers to the length from the outer edge of one leaf to the outer ledge of the other leaf, perpendicularly across the pin (i.e., open width). Hinge length refers to the length of the leaves parallel to the pin. Knuckle length refers to the typical length of an individual knuckle parallel to the pin. Leaf width refers to length from the center of the pin to the outer edge of the leaf. Pitch refers to the distance from the end of a knuckle to the same edge of the adjacent knuckle on the same leaf. Slop refers to loose angular movement of the leaves relative to the pin.

Alternatively, the hinge 37 can be a living hinge. A living hinge is a thin flexible hinge (flexure bearing) made from the same material as the two rigid pieces, e.g., the upper and lower shells of the first oyster replica 30, the living hinge connects. The living hinge is typically thinned or cut to allow the rigid pieces to bend along the line of the hinge. The minimal friction can make the living hinge more desirable in microelectromechanical systems or for connecting smaller rigid pieces.

The hinge 37 can comprise any known device which connects two solid objects, typically allowing only a limited angle of rotation between them. Some hinges aim to connect two objects such that rotation is relative about a fixed axis of rotation and all other translations or rotations are prevented (i.e., there is only one degree of freedom). The hinge 37 can be made from substantially rigid materials such as steel, flexible materials such as flexure bearings, or even of moving components. Non-limiting exemplary types of hinges include spring hinges, barrel hinges, pivot hinges, butt/mortise hinges, case hinges, continuous hinges or piano hinges, concealed hinges, butterfly hinges, flag hinges, strap hinges, H hinges, HL hinges, and the like.

Figure 3:
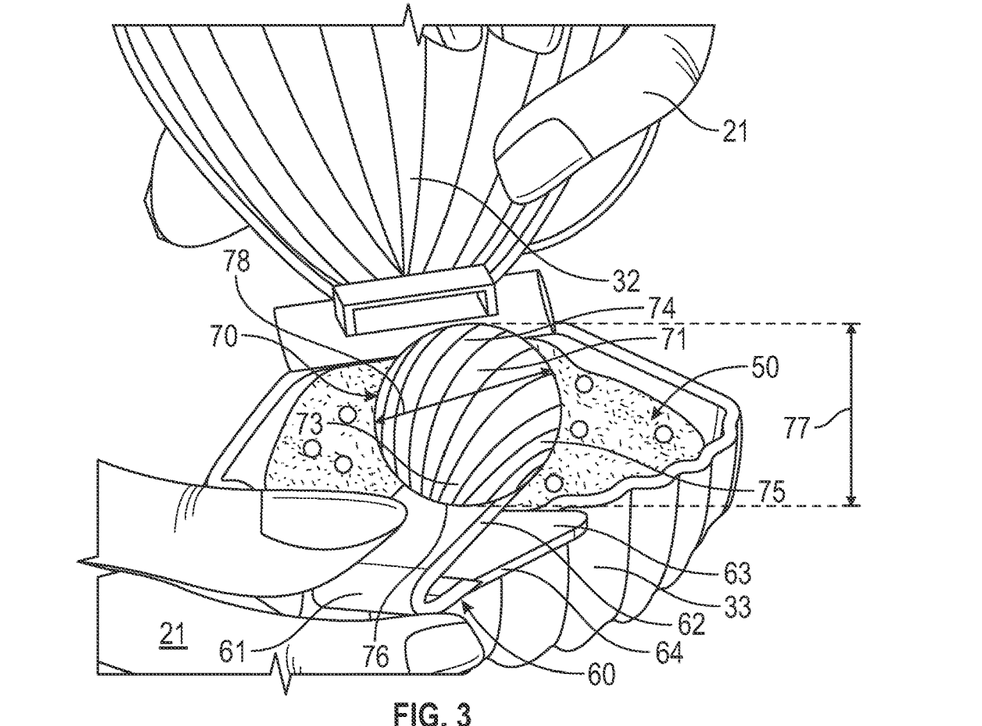
FIG. 3 shows a perspective view of an oyster-shaped toy system having an openable mermaid tail replica inside a larger openable oyster, the larger openable oyster in an open position, according to some aspects of the present disclosure.

According to some alternative aspects of the present disclosure, the upper shell and the lower shell can be identically shaped such that the first oyster replica 34 is substantially symmetrical about an axis running longitudinally through the hinge 37, the upper shell and lower shell can be integrally formed with one another, and/or the upper shell and lower shell can be substituted for other replica upper and lower members, such as halves of a mermaid tail replica (as is shown in FIG. 3).

In some embodiments, grooves or ridges 38 are included on the exterior surfaces 31, 33 of the upper and lower shell to provide a tactile element and/or an imagination inspiring element to the first oyster replica 30. Depending on the replica provided, the tactile element may comprise any one or more of scales, indents, notches, bumps, tabs, and/or apertures in lieu of the grooves or ridges 38.

According to some other aspects of the present disclosure, the edges mate well enough such that the first oyster replica 30 is watertight and/or airtight when in a closed position. A breakable heat seal 39 can be provided at the anterior portion 36 of the first oyster replica 30 to retain the first oyster replica 30 in the closed position until pried open by a user employing sufficient force. Keeping the first oyster replica 30 in the closed position before use aids in preventing the loss or damage of internal components within the first oyster replica 30.

The breakable heat seal 39 can be established with a heat sealer configured to seal products, packaging, and other thermoplastic materials using heat. Heat sealing is performed with uniform thermoplastic monolayers or with materials having several layers, at least one being thermoplastic. Heat sealing can join two similar materials together or can join dissimilar materials together.

Also included in the toy system or kit 20 is a second, smaller oyster replica 40 having an upper shell and a lower shell nested in the first, larger oyster replica 30. Similar to the first oyster replica 30, the second oyster replica 40 includes an exterior surface(s) 41, an interior surface(s) 42, a posterior portion 43, and an anterior portion 44. Grooves or ridges 45 can be included on the exterior surface(s) 41 of the upper and lower shell to provide a tactile element and/or an imagination inspiring element to the second oyster replica 40. Depending on the replica provided, the tactile element may comprise any one or more of scales, indents, notches, bumps, tabs, and/or apertures in lieu of the grooves or ridges 45.

Figure 4:
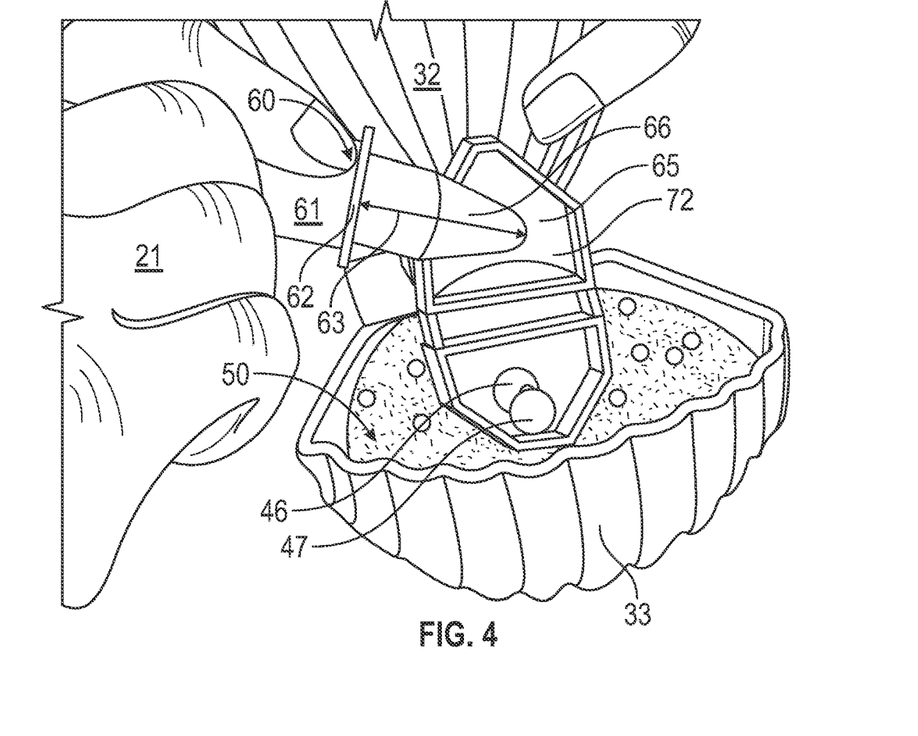
FIG. 4 shows a perspective view of an oyster-shaped toy system having an openable mermaid tail replica inside a larger openable oyster, the larger openable oyster and the mermaid tail replica open positions, according to some aspects of the present disclosure.

According to some non-limiting aspects of the present disclosure, the second oyster replica 40 can be opened and a surprise treasure revealed inside. The surprise treasure can, for example, be first pearl replica 46 and/or second pearl replica 47 nesting in the second oyster replica 40 (as shown in FIG. 4). The second pearl replica 47 may be identical to or distinguished from the first pearl replica 46 with respect to at least one characteristic selected from the group consisting of: color, shape, size, and material. Alternatively, the surprise treasure can be a different type of replica, a paper with a fortune or a clue printed thereon, an edible item, or any item known to engage the interest of a child. The surprise treasure can be selected from a group of treasures assigned varying rarities. This challenges children to build a comprehensive collection and results in a child building an emotional connection with his or her personalized collection of salvaged treasures.

Also included in the toy system or kit 20 is a play compound 50. The play compound 50 forms a mantle 51 of the first oyster replica 30. The mantle 51 typically occupies or is positioned on at least a portion of an interior surface 34 of the lower shell of the first oyster replica 30. The exterior surface 41 of the second oyster replica 40 is then positioned in the mantle 51 or at least partially adheres to a portion of the play compound 50. The heat seal 39 is particularly effective at preventing the second oyster replica 40 and/or the play compound 50 from substantially moving (e.g., the play compound 50 is prevented from oozing out of the first oyster replica 30 or into the second oyster replica 40) or deteriorating before the first oyster replica 30 is initially opened. In a preferred embodiment, the play compound 50 is kept in a heat seal 39 inside the first oyster replica and the first oyster replica 30 can also optionally be kept within a heat seal 39 such that the kit 20 has two or more heat seals 39. To open the second oyster replica 40, a child first digs the second oyster replica 40 out of the mantle 51 before subsequently opening the second oyster replica 40 and salvaging any treasure contained therein.

The play compound 50 is a material of the type for use in play and/or crafts and can be non-toxic. Some play compounds of this type conventionally include a cross-linked polymer, such as an adhesive, such as white glue, and which is manufactured under factory conditions by combining polyvinyl alcohol solutions with borate ions. The play compound 50 can be odorless or a particular odor can be added to the same. The play compound 50, which is liquid or at least semi fluid, can be formed of a particular color and is cold and slimy to the touch. The play compound 50 can also be referred to as a non-Newtonian fluid in that the viscosity of the fluid can be affected by factors other than temperature, such as, for example, by the application of a shear stress caused by any of squeezing, stirring, agitating or applying mechanical pressure to the play compound 50.

The play compound 50 can be formed from a plurality of different powder types and water. The different powder types can be selectively used alone or in combination to form a particular play compound. The powders may differ in terms of any or any combination of color; consistency; ingredients; additional additives 53 such as glitter, small plastic hearts or stars, and the like. Ingredients of the powder include gum, such as Guar gum, Borax (or another borate); a colorant 52, such as a suitable color pigment or combination of color pigments; starch; a phosphate such as Sodium Hydrogen phosphate; an ethanol; and/or an acetate such as Sodium dehydroacetate. In a specific embodiment, a borate is not included. Any one or more of the ingredients may provide a visual and/or a tactile effect. Tactile effects affect how an object feels to a person when touching the object. Visual effects affect how an object appears to a person when looking at the object. Non-limiting examples of visual effects include changing the color of an object; increasing or decreasing color contrast between adjacent objects; increasing or decreasing an object's reflectivity; and emitting light with an object such as a light bulb or a phosphor. Other additives contemplated herein can even give the play compound 50 a particular scent.

Ratio(s) of each provided ingredient of the play compound 50 are linked to a particular composition of the play compound which will be provided. For example, if there is a greater quantity of powder added to an amount of liquid, then the play compound will have greater viscosity and/or other characteristic. If a smaller quantity of powder is added to the amount of liquid, the play compound will have a lower viscosity and/or other characteristic. Each of the compounds can be linked to a particular identifiable type or characteristic of play compound such as, clay, dough, rubber, certain resins, sand, gel, slimy substance and/or other art/craft compound. The specific ingredients or additives contained within the play compound 50 are typically provided in set percentages under factory conditions. However, the composition of the play compound 50 may be later altered by a user with other ingredients and/or additives to make a new play compound with at least some user selected characteristics.

Figure 5:
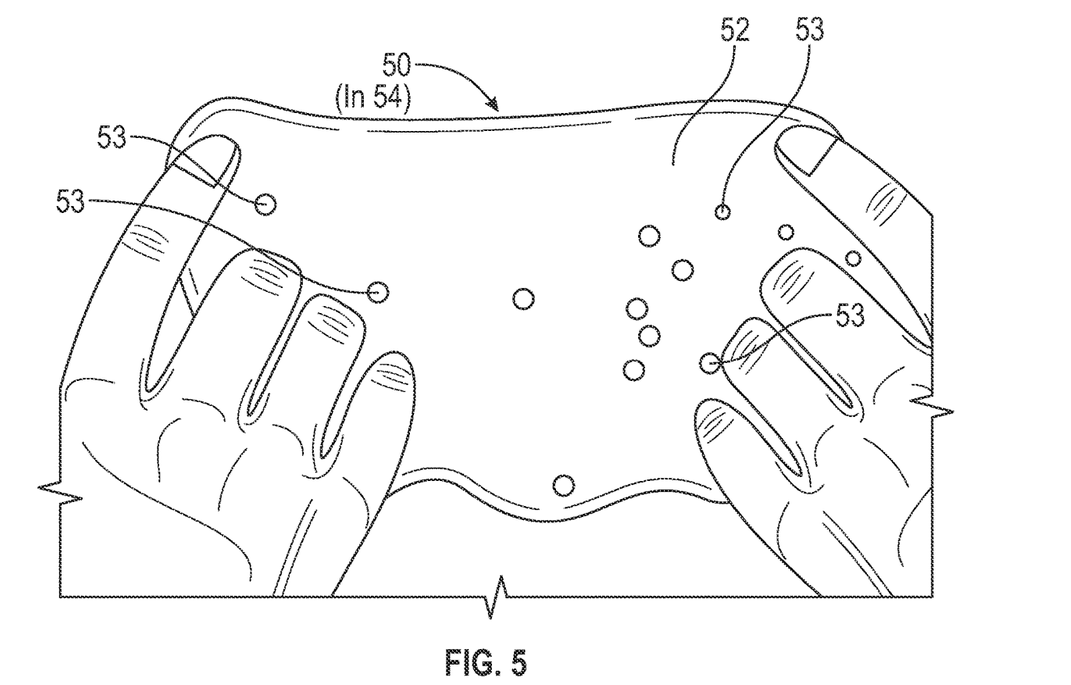
FIG. 5 shows a detailed view of a play compound included in the oyster-shaped toy system, according to some aspects of the present disclosure.

To play with the play compound 50 individually, the play compound 50 can be manipulated by the user's hands 21 to take selected forms such as a stretch form 54 as shown in FIG. 5 and a compact form 55 as shown in FIGS. 1-4. When manipulated, the play compound 50 can be described as having a bubbly, stretchy, glitzy, and/or cracking nature. Children will appreciate the play compound 50, and once moved into a particular shape, the play compound 50 has a tendency to stay in that shape until further manipulated by the child. This type of compound and the manipulation of the same can provide entertainment for many hours to children.

Optionally included with the toy system or kit 20 is an opening tool 60 which can be designed according to a shared theme with the replicas and configured to facilitate the opening of an object. For example, the opening tool 60 can be designed to mimic a shovel or a sword, as shown in FIGS. 3-4. The opening tool 60 can include a hilt 61 or other type of handle, which may even include a pommel and a grip; a cross-guard or step 62 to prevent the opening tool 60 from penetrating the first or second oyster replicas 30, 40 too deeply when being opened, thereby preventing injury to children or damage to internal components; and a blade 63 with an edge 64, a point 65, and/or a central ridge 66, the blade preferably somewhat dull and suited to aid a child in prying open a selected replica or other openable object. The opening tool 60 may be mounted to the first oyster replica 30 at a location on the interior or exterior surfaces 31-34 of the first oyster replica 30.

Also shown in FIGS. 3-4 is a mermaid tail replica 70 which may be included in lieu of any one or more of the oyster replicas 30, 40. The illustrated mermaid tail replica 70 includes a mermaid tail exterior surface 71, a mermaid tail interior surface 72, a mermaid tail posterior portion 73, a mermaid tail anterior portion 74, scales 75 on the mermaid tail exterior surface 71, and a fin 76 at the mermaid anterior portion 74. The mermaid replica 70 can be characterized by a tail length 77 and tail width 78.

The scales 75 provide a tactile element and/or an imagination inspiring element to the first oyster replica 30. Depending on the replica provided, the tactile element may comprise any one or more of grooves, ridges, indents, notches, bumps, tabs, and/or apertures in lieu of the scales 75. Providing more fins 76 may enhance the aesthetic appearance of the mermaid tail 70 and thereby more directly engage the interest of the child.

Figure 6:
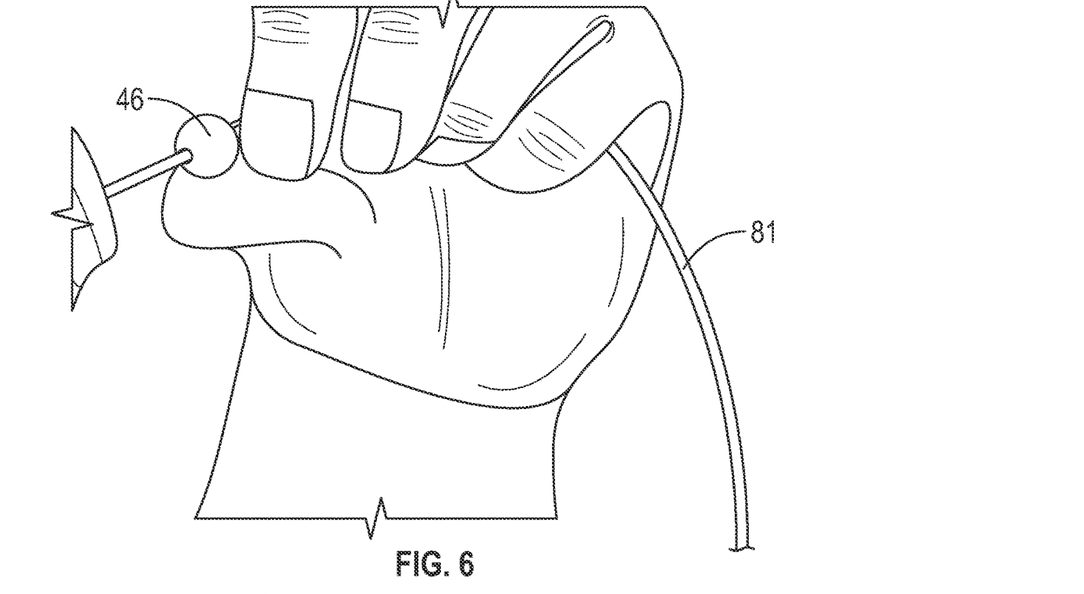
FIG. 6 shows a detailed view of a pearl replica being threaded onto a string to form a necklace or a bracelet, according to some aspects of the present disclosure.
Figure 7:
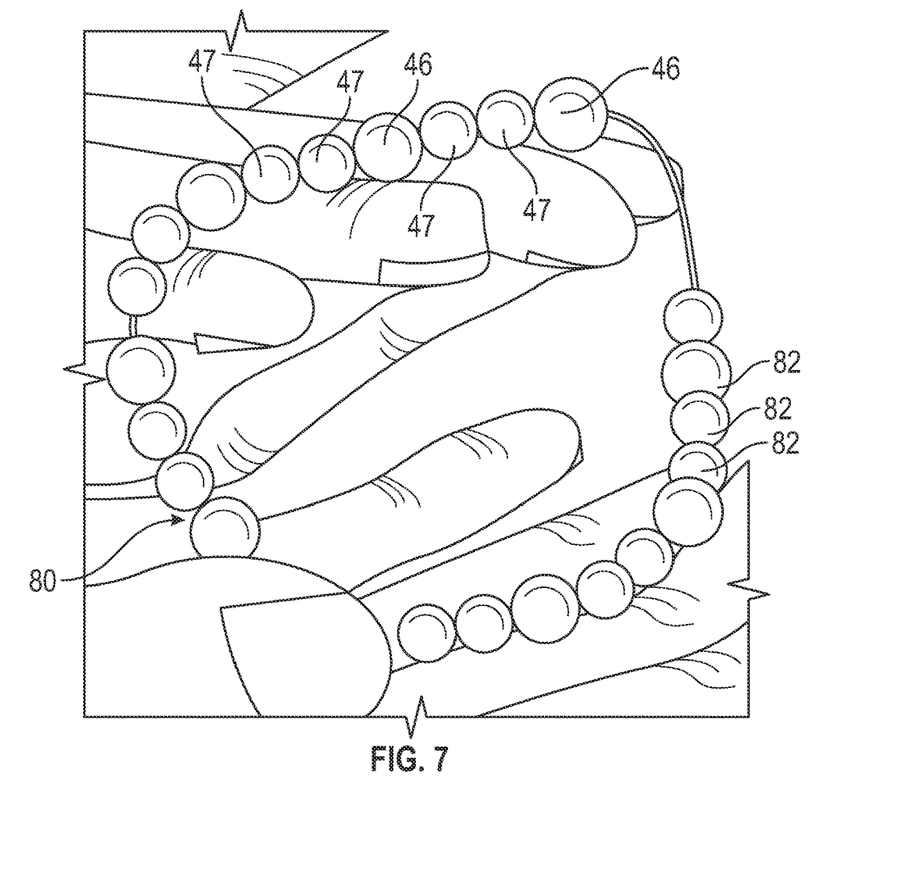
FIG. 7 shows a detailed view of a bracelet formed of pearl replicas, according to some aspects of the present disclosure.

Optionally included with the toy system or kit 20 is a string 81 and bracelet or necklace ornamentation 82 for forming a bracelet or necklace 80, as shown in FIGS. 6-7. The string 81 may comprise silk, nylon, polyester, polypropylene, fibers, animal hair, and/or the like. The bracelet or necklace ornamentation 82 includes a small aperture which helps the ornamentation slide onto the string 81 to form the bracelet or necklace 80. The bracelet or necklace ornamentation 82 can be collected or salvaged from the second oyster replica 40, the mermaid tail replica 70, or another replica nested in a larger replica. When a child builds up enough of a collection, the child may arrange the collected treasures, such as first and second pearl replicas 46, 47 in a desired pattern or configuration which appeals to the child's aesthetic preferences. Once assembled onto the bracelet or necklace 80, the bracelet or necklace ornamentation 82 can be later removed such that the child may then form a different bracelet or necklace by arranging the bracelet or necklace ornamentation 82 according to a different desired pattern or configuration which appeals to the child's aesthetic preferences. This could occur, for example, if the child wishes to change the type of jewelry (e.g., from a bracelet to a necklace or vice versa) or after the child continues to build up his or her collection of treasures and is able to form new combinations not previously attainable with size or collected treasures of their former collection. As the size and variety of the child's collection continues to grow, the possible jewelry configurations grow exponentially.

Figure 8:
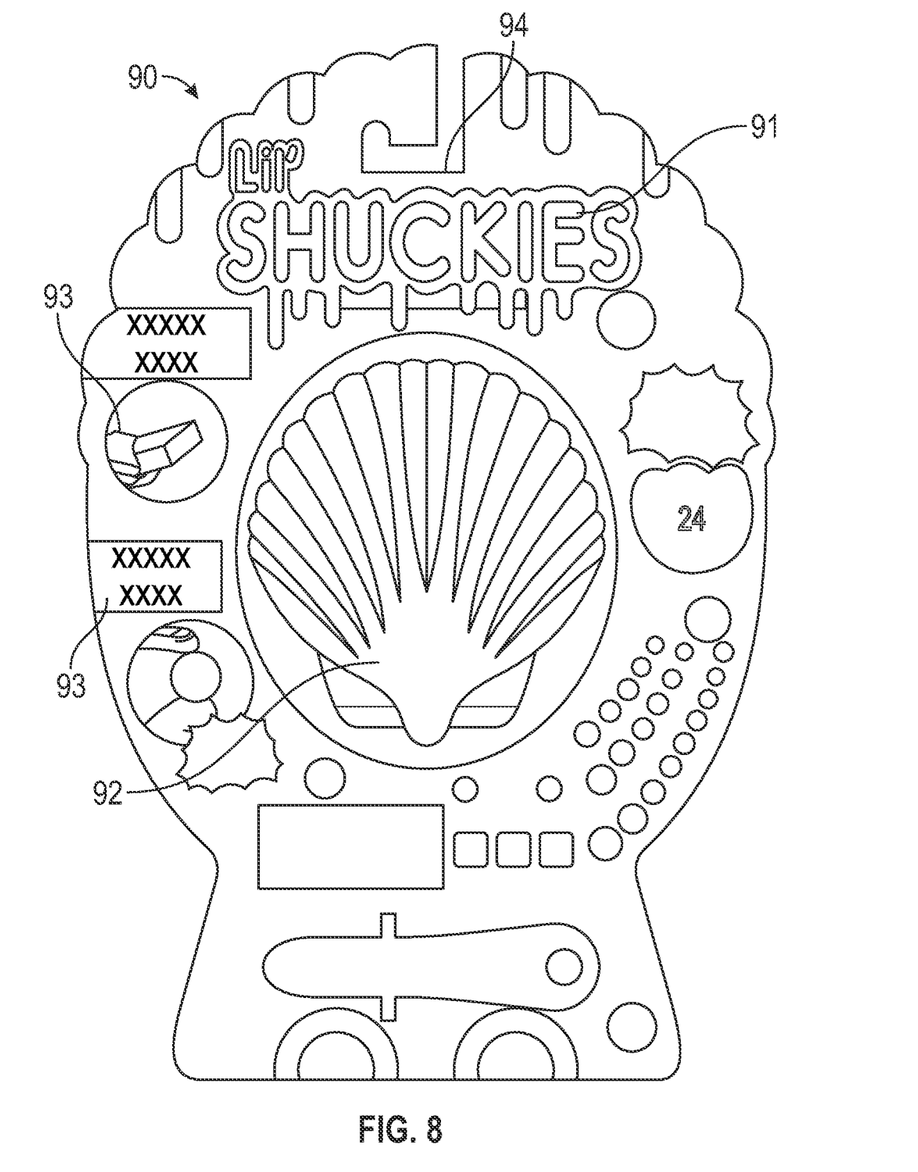
FIG. 8 shows oyster-shaped product packaging for the oyster-shaped toy system, according to some aspects of the present disclosure.
Figure 9:
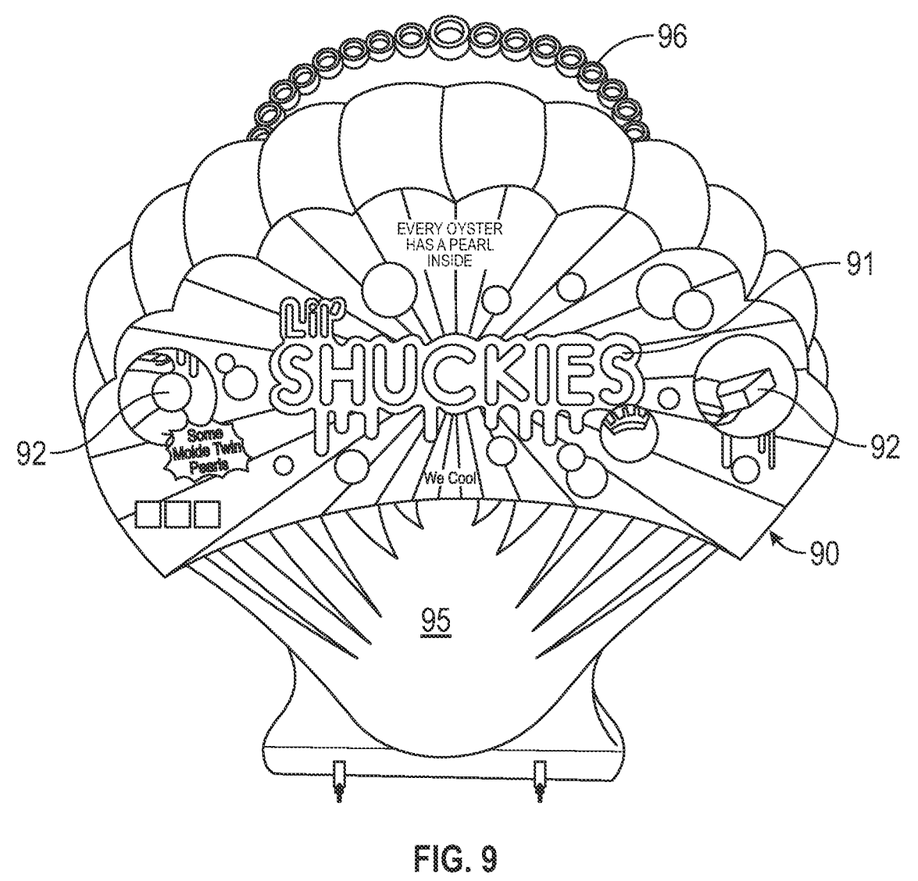
FIG. 9 shows an oyster-shaped carry case for the oyster-shaped toy system, according to some aspects of the present disclosure.

Optionally included with the toy system or kit 20 is packaging 90, as shown in FIGS. 8-9. The packaging 90 typically encompasses a portion of or completely subsumes at least the first oyster replica 30. The packaging 90 can comprise plastics, thermoplastics, glass, wood, wood wool, paper, paperboard, corrugated cardboard, other biodegradable or recyclable materials, or the like. The packaging 90 can comprise a product identifier 91, such as a word or trade mark, on the packaging; image(s) 92 of at least one component and/or the entirety of the toy system or kit 20 on or near the packaging 90; instructions 93 for using a part or all of the toy system or kit 92; and a hang tab 94 from which the packaging 90 can hang from shelves in public stores, where the toy system or kit 90 is then marketed for children. Perforations, folds, pull strings, and/or other predefined points of failure which facilitate ripping, cutting, and/or opening can be included in or with the product packaging 90. As shown in FIG. 9, a carrying case 95 having a handle 96 can be included to store components of the toy system or kit 20 during sale or while a child continues to collect treasures. The carrying case 95 can have a shape substantially identical to a shape of the first oyster replica 30. In this way, during transport or during sale, the first oyster replica 30 actually nests inside the carrying case 95, adding yet another layer to the "nest".

According to some other aspects of the present disclosure, a child may use the toy system or kit 20 with their friends or to engage social media. For example, children can share with other children the contents of their collection, which may potentially lead to children trading items of their collection to other children for items in their collection.

A person may be broadcasted on a social media platform opening selected replicas to salvage treasure contained therein. The social media platform may be accessed through a network. The network could, for example, be a wide area network ("WAN"), a TCP/IP based network, a cellular network, a local area network ("LAN"), a neighborhood area network ("NAN"), a home area network ("HAN"), or a personal area network ("PAN") employing any of a variety of communications protocols, such as Wi-Fi, Bluetooth, ZigBee, near field communication ("NFC"), etc., although other types of networks are possible and are contemplated herein. The network typically allows communication between the communications module and the central location during moments of low-quality connections. Communications through the network can be protected using one or more encryption techniques, such as those techniques provided in the IEEE 802.1 standard for port-based network security, pre-shared key, Extensible Authentication Protocol ("EAP"), Wired Equivalent Privacy ("WEP"), Temporal Key Integrity Protocol ("TKIP"), Wi-Fi Protected Access ("WPA"), and the like.

From the foregoing, it can be seen that the present invention accomplishes at least all of the stated objectives.

LIST OF REFERENCE CHARACTERS

The following reference characters and descriptors are not exhaustive, nor limiting, and include reasonable equivalents. If possible, elements identified by a reference character below and/or those elements which are near ubiquitous within the art can replace or supplement any element identified by another reference character.

20 toy system or kit
21 hands
30 first oyster replica
31 upper shell exterior surface
32 upper shell interior surface
33 lower shell exterior surface
34 lower shell interior surface
35 first oyster posterior portion
36 first oyster anterior portion
37 hinge
38 grooves or ridges
39 heat seal
40 second oyster replica
41 second oyster exterior surface(s)
42 second oyster interior surface(s)
43 second oyster posterior portion
44 second oyster anterior portion
45 grooves or ridges
46 first pearl replica
47 second pearl replica
50 play compound 51 mantle
52 colorants (e.g., dyes, pigments or powders, etc.)
53 decorative additives (e.g., glitter, hearts, stars, etc.)
54 stretch form
55 compact form
60 opening tool (e.g. sword replica, shovel replica, etc.)
61 hilt
62 cross-guard or step
63 blade
64 edge
65 point
66 central ridge
70 mermaid tail replica
71 mermaid tail exterior surface
72 mermaid tail interior surface
73 mermaid tail posterior portion
74 mermaid tail anterior portion
75 scales
76 fin(s)
77 tail length
78 tail width
80 bracelet or necklace
81 string
82 bracelet or necklace ornamentation
90 packaging
91 product identifier
92 image(s)
93 instructions
94 hang tab
95 carrying case
96 handle Exemplary Embodiments The present disclosure is further defined by the following numbered paragraphs:

1. A toy system comprising:
a first, openable replica;
a play compound positioned on a portion of an interior surface of the first replica; and
a second replica nested within the first replica and positioned partially within the play compound.
2. The toy system of paragraph 1 wherein the first replica includes an upper shell and a lower shell.
3. The toy system of paragraph 2 wherein the play compound completely covers an interior surface of the lower shell.
4. The toy system of any one of paragraphs 1-3 wherein the first replica includes a hinge.
5. The toy system of any one of paragraphs 1-4 wherein the second replica is a pearl replica.
6. The toy system of any one of paragraphs 1-4 wherein the second replica is an openable mermaid tail.
7. The toy system of any one of paragraphs 1-4 wherein the second replica is openable and includes an upper shell and a lower shell.
8. The toy system of any of one of paragraphs 1-7 further comprising a third replica nested within the second replica.
9. The toy system of paragraph 8 wherein the third replica is a pearl replica.
10. The toy system of paragraph 8 further comprising a fourth replica nested within the second replica.
11. The toy system of paragraph 10 wherein the third replica and the fourth replica are identical.
12. The toy system of paragraph 10 wherein the third replica and the fourth replica are distinct.
13. The toy system of any one of paragraphs 1-12 further comprising a carrying case having a shape substantially identical to a shape of the first replica.
14. The toy system of any one of paragraphs 1-13 wherein the play compound is formed of two or more play compound components selected from the group consisting of:
a borate;
guar gum;
starch;
a colorant;
a phosphate;
an ethanol;
an acetate;
a decorative additive; and
water;
wherein at least one of the play compound components is included to provide a visual or tactile effect.
15. The toy system of any one of paragraphs 1-14 wherein the play compound can be physically manipulated between a compact form and a stretch form.
16. The toy system of any one of paragraphs 1-15 wherein the first replica comprises a thermoplastic.
17. The toy system of any one of paragraphs 1-16 further comprising a heat seal to retain the first replica in a closed position.
18. The toy system of any one of paragraphs 1-17 wherein at least one of the replicas includes an exterior surface having at least one tactile element selected from the group consisting of:
indents;
notches;
bumps;
tabs; and
apertures.
19. The toy system of any one of paragraphs 1-17 wherein at least one of the replicas includes an exterior surface having at least one tactile element selected from the group consisting of:
grooves;
ridges; and
scales.
20. The toy system of any one of paragraphs 1-19 further comprising an opening tool mounted to the first replica for opening the first replica and/or the second replica.
21. A toy kit comprising:
a first, openable replica;
a play compound; and
a second replica capable of nesting in the first replica.
22. The toy kit of paragraph 21 further comprising a third replica configured to nest in the second replica.
23. The toy kit of paragraph 22 further comprising a fourth replica configured to nest in the second replica.
24. The toy kit of any one of paragraphs 21-23 further comprising an opening tool for opening the first replica and/or the second replica.
25. The toy kit of paragraph 24 wherein the opening tool comprises a blade with an edge and a point.
26. The toy kit of paragraph 25 wherein the opening tool further comprises a hilt for gripping the opening tool.
27. The toy kit of paragraph 26 wherein the opening tool further comprises a cross-guard or step for preventing injury to a user and/or damage to an object contained within the first replica and/or second replica.
28. The toy kit of any one of paragraph 21-27 further comprising a carrying case for transporting at least the first replica.

29. The toy kit of paragraph 28 wherein the carrying case comprises a handle.
30. The toy kit of any one of paragraphs 28-29 wherein the carrying case comprises a shape substantially identical to a shape of the first replica.
31. The toy kit of any one of paragraphs 21-30 further comprising packaging encompassing a portion of the first replica.
32. The toy kit of paragraph 31 further comprising a product identifier on the packaging.
33. The toy kit of any one of paragraphs 31-32 further comprising an image of at least one component of the toy kit on the packaging.
34. The toy kit of any one of paragraphs 31-33 wherein the packaging comprises a hang tab.
35. The toy kit of any one of paragraphs 21-34 further comprising a string for forming a bracelet and/or a necklace.
36. The toy kit of paragraph 35 further comprising ornamentation for the bracelet and/or the necklace.
37. The toy kit of paragraph 36 further comprising additional ornamentation for the bracelet and/or the necklace distinct from the ornamentation.
38. The toy kit of any one of paragraphs 21-37 further comprising instructions for using at least one component of the toy kit.
39. The toy kit of any one of paragraphs 21-38 wherein the play compound is formed of two or more play compound components selected from the group consisting of:
  a borate;
  guar gum;
  starch;
  a colorant;
  a phosphate;
  an ethanol;
  an acetate;
  a decorative additive; and
  water;
wherein at least one of the play compound components is included to provide a visual or tactile effect.
40. The toy kit of any one of paragraphs 21-39, wherein the play compound is stored within a heat seal.
41. The toy kit of any one of paragraphs 21-40 wherein the play compound can be physically manipulated between a compact form and a stretch form.
42. A method of playing with a toy system comprising:
opening a first replica; and
digging a second replica out of a play compound located within the first replica.
43. The method of paragraph 42 further comprising opening the second replica.
44. The method of paragraph 43 further comprising salvaging a third replica from within the second replica.
45. The method of any one of paragraphs 42-44 further comprising broadcasting a person performing each step of the method.
46. The method of any one of paragraphs 42-45 wherein the opening step(s) comprise: gripping an opening tool; inserting the opening tool in a selected replica; and prying the selected replica open.
47. The method of any one of paragraphs 42-46 further comprising repeating each step of the method to collect ornamentation of varying rarity for a bracelet and/or a necklace.
48. The method of paragraph 47 further comprising assembling a bracelet and/or a necklace with a string and the ornamentation for the bracelet and/or the necklace.
49. The method of any one of paragraphs 42-48 further comprising adding a colorant and/or a decorative additive to alter the play compound.
50. The method of any one of paragraphs 42-49 further comprising stretching and/or compacting the play compound.
51. The method of any one of paragraphs 42-50 further comprising storing components of the toy system in a carrying case.

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The term "play" can be used herein as an adjective, a verb, a noun, or any suitable part of speech given proper context. As an adjective, "play" means relating to an activity engaged in for enjoyment and recreation, especially by children. Similarly, as a verb, to play means to engage in a game or activity for enjoyment or recreation. As a noun, play refers to an activity engaged in for enjoyment and recreation. For example, a play compound can be a moist, soft, slippery, and viscous substance used by children for enjoyment and recreation.

The terms "nested" and "nesting" are conjugations of the verb phrase "to nest." As used herein, the verb phrase "to nest" and its conjugations describe fitting an object or objects inside a larger one. Thus, the verb phrase "to nest" and its conjugations can, for example, describe an object or objects which may be of a similar shape to the larger object, objects which are graduated in size, or an object or objects made to fit close together with one another.

The term "replica" as used herein describes a model or a copy of something. In the context of children's toys, children can manifest a marked increase in pretend-play with toy objects that are replicas of real objects specifically designed to stand for other objects. However, it should still be appreciated that where a replica is included, the replica can be substituted for the real thing and vice versa.

The term "oyster" refers to any of a number of bivalve mollusks with rough irregular shells. With respect to the "oyster replicas" described herein, it is to be appreciated that no model or copy of any internal organs necessary to give life to the oyster be included. The replica is intended to give only a similar outer aesthetic appearance. In this way, an oyster replica is considered equivalent to a clam replica, a mussel replica, a scallop replica, or any a replica of any other mollusk known to have an external calcareous shell.

The "scope" of the present invention is defined only by the appended claims, along with the full scope of equivalents to which such claims are entitled. The scope of the invention is further qualified as including any possible combination of any of the aspects of any of the embodiments disclosed to result in additional embodiments, combinations,

What is claimed is:

1. Nested replicas comprising:
   a first, openable replica comprising a thermoplastic;
   a heat seal to retain the first replica in a closed position;
   a play compound positioned on a portion of an interior surface of the first replica, wherein the play compound is formed of two or more play compound components selected from the group consisting of: a borate; guar gum; starch; a phosphate; an ethanol; an acetate; and water;
   a decorative additive selected from the group consisting of: a colorant; a glitter, a heart, and a star;
   a second replica nested within the first replica and positioned partially within the play compound; and
   a third replica nested within the second replica or nested within the first replica and positioned partially within the play compound;
   wherein at least two of the second replica, the third replica, and the decorative additive can be removed from the play compound and selectively incorporated into a customizable wearable;
   wherein at least one of the play compound components is included to provide a visual or tactile effect.

2. The nested replicas of claim 1 wherein:
   the first replica includes an upper shell, a lower shell, and a hinge between the upper shell and the lower shell; and
   the play compound completely covers an interior surface of the lower shell.

3. The nested replicas of claim 2 wherein the second replica is selected from the group consisting of a pearl replica, an openable mermaid tail, and an openable shell.

4. The nested replicas of claim 1 further comprising a fourth replica nested within the second replica.

5. The nested replicas of claim 1 wherein at least one of the replicas includes an exterior surface having at least one tactile element selected from the group consisting of:
   indents;
   notches;
   bumps;
   tabs; and
   apertures.

6. The nested replicas of claim 1 wherein at least one of the replicas includes an exterior surface having at least one tactile element selected from the group consisting of:
   grooves;
   ridges; and
   scales.

7. A toy kit comprising:
   the nested replicas of claim 1; and
   a string for forming a bracelet and/or a necklace.

8. The toy kit of claim 7 further comprising a carrying case having a shape substantially identical to a shape of the first replica.

9. The toy kit of claim 7 further comprising an opening tool mounted to the first replica for opening the first replica and/or the second replica, said opening tool comprising a blade with an edge and a point, a hilt for gripping the opening tool, and a cross-guard or step for preventing injury to a user and/or damage to an object contained within the first replica and/or second replica.

10. The toy kit of claim 7 further comprising packaging encompassing at least a portion of the first replica.

11. The toy kit of claim 7 further comprising a product identifier on a packaging and/or instructions for using at least one component of the toy kit.

* * * * *